INVENTORS
Yvon BUREAU
Maurice COULOMBE
BY
Pierre Lesperance

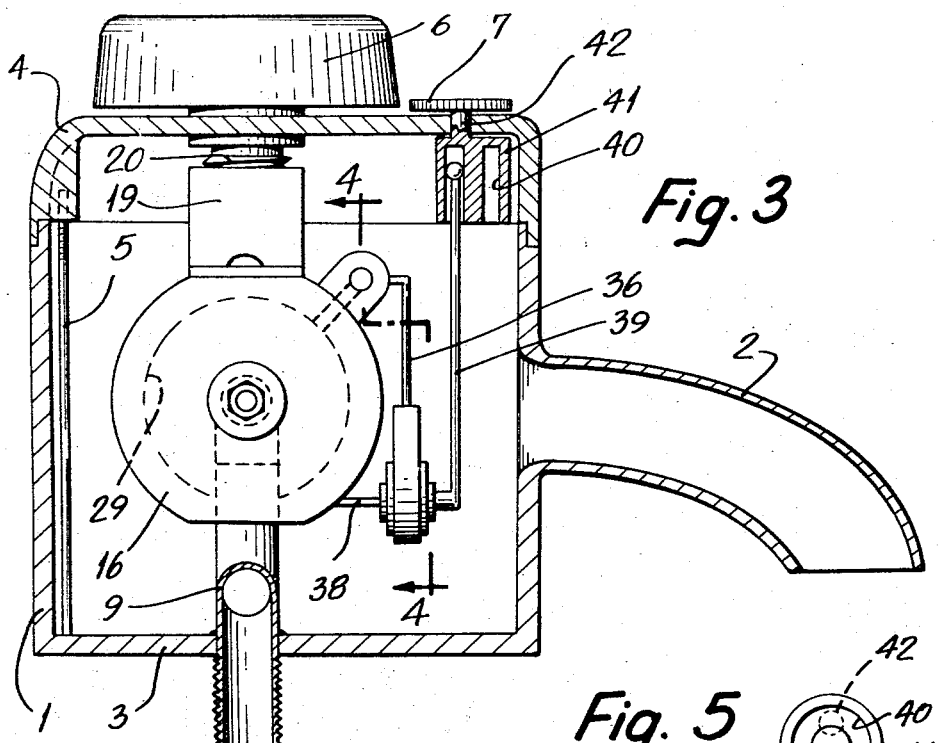
Fig. 3
Fig. 5
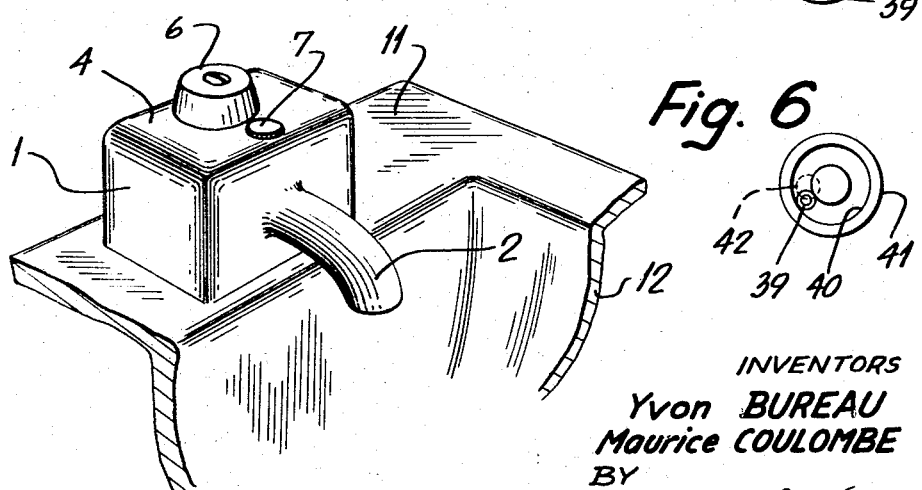
Fig. 6
Fig. 1
INVENTORS
Yvon BUREAU
Maurice COULOMBE
BY
Pierre L'espérance
PATENT AGENT Nov. 14, 1967  M. COULOMBE ET AL  3,352,489
THERMOSTATIC MIXING VALVE
Filed Dec. 27, 1965  3 Sheets-Sheet 2

PATENT AGENT

Nov. 14, 1967    M. COULOMBE ET AL    3,352,489
THERMOSTATIC MIXING VALVE
Filed Dec. 27, 1965    3 Sheets-Sheet 3

INVENTORS
Yvon BUREAU
Maurice COULOMBE
BY
Pierre Lesperance
PATENT AGENT

# United States Patent Office 3,352,489
Patented Nov. 14, 1967

3,352,489
THERMOSTATIC MIXING VALVE
Maurice Coulombe, 4296 Charles Bedard Place, Charlesbourg, Quebec, Canada, and Yvon Bureau, 518 5th St., Limoilou, Quebec, Canada
Filed Dec. 27, 1965, Ser. No. 516,431
8 Claims. (Cl. 236—12)

ABSTRACT OF THE DISCLOSURE

This invention concerns a thermostatic mixing valve which maintains the discharged fluid at set adjustable temperature irrespective of the temperatures and pressures of the two ingoing fluids to be mixed. The valve further has a means to vary the rate of flow of the outgoing fluid. The valve comprises a block having a pair of separate passages for cold and hot fluids under pressure and each having an inlet and an outlet provided with a valve seat, a casing surrounding the block and in communication with the passage outlets for receiving and mixing the hot and cold fluids, an outlet for the casing disposed above the bottom of the casing, the valve seats being axially aligned, a valve stem slidable within the block and extending therethrough, main valve members secured to both ends of said valve stem and co-operable with the valve seats respectively, whereby axial movement of the valve stem will open one valve member and will close the other, a pressure chamber surrounding the middle portion of the valve stem and made in the block, a fluid-tight diaphragm separating the pressure chamber into two half-chambers, each inlet communicating with its associated half-chambers for feeding fluid from the respective inlets to said separate half-chambers, bleeding passageways made in said block and connecting each half-chamber with said casing, each bleeding passageway having a valve seat formed in the block, the two last-named seats being spacedly disposed and axially aligned, a common double needle valve member for said valve seats of said bleeding passageways, said needle valve member being axially displaceable to close one bleeding passageway while opening the other bleeding passageway, and vice versa, and a temperature-responsive element immersed in the fluid of the casing and connected to said needle valve member to displace the same in accordance with temperature variations of said fluid in the casing, to thereby cause displacement of the main valve stem to readjust the ratio of cold and hot fluids.

The present invention relates to improvements in thermostatic mixing valves, in which water of low and high temperature from separate conduits, is supplied to the valve, and a mixture of intermediate temperature may be delivered in accordance with the proportions of cold and hot water being mixed, the proportioning mechanism being controlled by a thermostatic element, usually in the form of a bi-metal.

In known thermostatic mixing valves of this type, the bi-metal element must exert a considerable force, because it directly controls and actuates the proportioning cold and hot water valves without the assistance of any outside force, with the result that such known mixing valves are usually inaccurate in that the temperature of the outgoing liquid varies within relatively wide limits.

Moreover, due to the large size of the bi-metal element and of the presence of a lever mechanism connecting the bi-metal to the proportioning valves, the resulting assembly has a large size and is therefore unyieldy and not very well adapted for use in association with conventional washbasins and the like.

The general object of the present invention resides in the provision of a thermostatic mixing valve or faucet, which obviates the above disadvantages, being fundamentally characterized by the fact that it uses the pressure of the water to directly control and actuate the proportioning valves, means being provided for establishing a water pressure differential acting on the proportioning valves and being under the control of a thermostatic means, whereby said latter means can be made of small size and requiring to develop only a relatively small force.

Another object of the present invention resides in the provision of a mixing valve of the character described, which is very accurate in that the adjusted temperature of the output liquid will vary within a very narrow range, despite variations of temperature and pressure of the input cold and hot liquids.

Another object of the present invention resides in the provision of a valve of the character described, which can be made of relatively small size, which is simple and of relatively inexpensive construction and which will give a prolonged service, all the parts being of sturdy construction and with a minimum of linkages.

Another object of the present invention resides in the provision of a valve of the character described, provided with means for varying and adjusting the rate of flow of the output liquid.

The foregoing and other important objects of the present invention will become more apparent during the following disclosure and by referring to the drawings, in which:

FIGURE 1 is a perspective view of a mixing faucet in accordance with a first embodiment of the invention associated with a washbasin, shown partially in cross-section;

FIGURE 3 is a section, taken along line 3—3 of FIGURE 2;

FIGURES 5 and 6 are end views of the cam means for adjusting the thermostatic element in the first embodiment;

Figure 2:
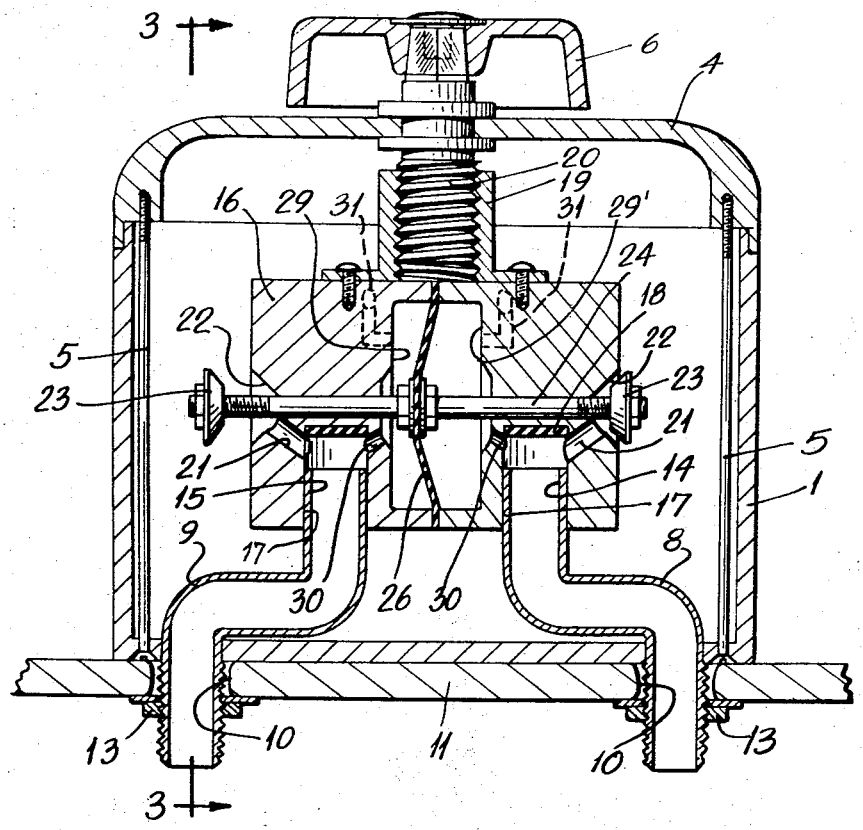
FIGURE 2 is a transverse section of the faucet of the first embodiment.
Figure 4:
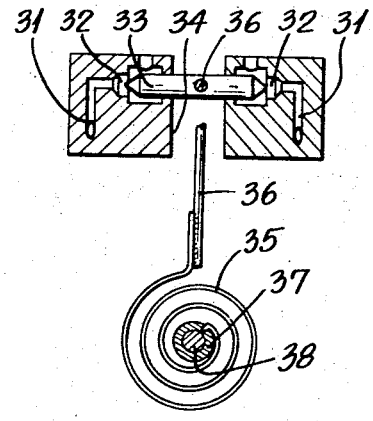
FIGURE 4 is a partial section, taken along line 4—4 of FIGURE 3.

Referring now more particularly to the drawings in which like reference characters indicate like elements throughout, the mixing valve in accordance with the first embodiment comprises a casing 1 having an output spout 2, depending from one lateral wall thereof and in communication with the interior thereof.

Casing 1 has an integral bottom 3 and is closed at the top by a removable cover 4, held in sealing condition by means of through bolts 5. A single flow rate adjusting knob 6 is disposed on top of cover 4, together with a temperature adjusting dial 7.

Cold and hot liquid inlet tubes 8 and 9, respectively, extend through bottom 3 and are secured thereto and are adapted to extend through holes 10 made in the top 11 of the washbasin 12, or the like, to be connected with cold and hot liquid supply pipes (not shown).

The casing 1 is secured to the washbasin 12 by means of nuts 13, or the like, threaded on the outer portions of tubes 8 and 9. The discharge end portions 14, 15 of tubes 8 and 9 are fully open and extend in a common plane perpendicular to the rotary axis of knob 6.

A block 16 is provided with two spaced blind bores 17 adapted to slidably receive the discharge portions 14 and 15 of the inlet tubes 8 and 9.

The bottom of the blind bores 17 is lined with gaskets 18. The top of block 16 is secured to and suspended from a bracket 19 having a threaded blind bore for receiving a threaded spindle 20, which is rotatably mounted within the cover 4 and extends therethrough to be secured to operating knob 6. Thus, upon rotation of said knob, block 16 is caused to be raised or lowered with respect to the stationarily mounted tubes 8 and 9, so as to approach more or less the gasket 18 from the discharge ends 14 and 15 of the tubes 8 and 9.

This provides for the control of the flow rate of the liquid being discharged.

Each blind bore 17 is in communication with the inside of casing 1 by means of a passage 21 in lateral communication with the blind bore adjacent gasket 18 and with a frusto-conical cavity 22, made at the outer face of block 16. There might be several passages 21 opening laterally into one cavity 22 so as not to restrict the flow of liquid from tubes 8 and 9 into the casing 1.

Each cavity 22 acts a valve seat for a proportioning valve member 23, the two valve members 23 for the hot and cold water passages respectively being adjustably secured to a common stem 24 at the outer ends thereof, said stem being mounted for sliding axial movement within a through bore made in block 16 co-axial with the frusto-conical cavities 22 at both ends of the block, and having its axis substantially perpendicular to the discharge portions 14 and 15 of tubes 8 and 9.

The block 16 is preferably made in two symmetrical half-parts rigidly secured by means of tie bolts, not shown, in end-to-end relationship, so as to define in the center of the block a pressure chamber separated in two sections 29, 29' in liquid-tight manner by means of a flexible diaphragm 26 sandwiched between the two half-blocks and surrounding stem 24, and secured thereon by means of washers 27 and nuts 28.

Each half-chamber 29, 29' is in communication with the respective blind bores 17 by means of a small bore feeding passage 30 opening laterally within the blind bore 17 adjacent gasket 18. Each half-chamber 29, 29' is also in communication with the inside of casing 1 through a small bore bleeding passage 31, of a diameter substantially equal to that of passage 30.

The bleeding passages 31 have axially aligned, spaced valve seats 32 adapted to be closed alternately by means of a common pilot needle valve member 33 in the form of a double-pointed stem, which bridges space 34 defined by two lateral extensions of the half-parts of block 16 on each side of the diaphragm 26.

The needle valve 33 is actuated by a bi-metal thermostatic element 35, wound in a spiral, the outer end of which is connected to the needle valve 33 by means of an L-shaped rod 36 which is pivoted inside a transverse central bore of needle valve 33, and which at its outer end is welded, or otherwise secured, to the outer end of the bi-metal 35.

The inner end of the bi-metal element 35 is secured to a bushing 37, itself surrounding and tightly secured to the horizontal leg 38 of an L-shaped rod 39. Leg 38 is pivotally mounted in a blind bore of block 16, while the upper end of its vertical leg slidably engages an annular cavity 40 made in a rotary cam element 41, disposed within the casing 1, and having an upstanding shaft 42 passing through cover 4 and secured to the control dial 7. Shaft 42 is eccentrically disposed with respect to annular cavity 40. Bi-metal 35 is located within casing 1 below the level of the inlet of spout 2 to be immersed in the mixed cold and hot water. The valve in accordance with the first embodiment operates as follows:

Block 16 is raised by means of knob 6 to uncover more or less lateral passage 21 to adjust the rate of discharge of water.

Supposing the water being discharged from spout 2 and which at least partially fills casing 1 and in which the bi-metal element 35 is immersed, is at the exact temperature for which the bi-metal element has been set by means of dial 7, the double needle valve 33 is then in centre position, thereby opening equally the two bleeding passages 31. Thus, the hot and cold water entering the two pressure half-chambers 29, 29' on each side of diaphragm 26 through feeding passages 30, are discharged at an equal rate through bleeding passages 31 and, therefore, the water pressure on each side of the diaphragm 26 is equal and the stem 24 remains in a centered position with the two valve members 23 equally spaced from their frusto-conical valve seats 22.

Supposing the water within casing 1 drops below the setting of the bi-metal, the bi-metal will displace the double needle valve member 33 to one side so as to close the valve seat 32 on the cold side, while allowing the other valve seat to remain fully open. Thus, pressure builds up within the half-chamber 29', the bleeding passage 31 of which is closed, while the other pressure half-chamber 29 remains open to casing 1. Therefore, there is established a pressure differential which acts on the diaphragm 26 and causes axial movement of stem 24, so as to fully close the cold water valve member 23 and fully open the hot water valve member 23. Thus, the cold water is cut off while the hot water is allowed to flow freely through the open passage 21.

Supposing the water becomes too hot, the bi-metal 35 immediately moves the needle valve 33 in the opposite direction to close the opposite bleeding passage 31 and thereby opens the other bleeding passage, whereby the pressure differential on opposite sides of diaphragm 26 is reversed and the valve stem 24 is moved in the opposite direction, to open the cold water discharge and close the hot water discharge. It will be noted that bleeding passage 31 must have a sectional area at least equal to that of feeding passage 30 so as to lower the pressure in the half-chamber 29 or 29' to substantially the pressure existing in casing 1, in order to produce the pressure differential.

It is seen that the proportioning valve formed by stem 24 and by bi-metal 23 and valve seats 22, is actuated by the water pressure differential on each side of diaphragm 26 and that the bi-metal element 35 only serves to displace the small diameter pilot needle valve 33 against the reduced force produced on the latter under the pressure discharge of the small bore bleeding passage 31. Thus, the bi-metal 35 need not be of such a type as to develop a large force and, moreover, because it only has to develop a small force to move needle valve 33, the sensitivity of the arrangement is very high, and for any preset temperature of the thermostat, the actual variations of the temperature of the water being discharged will vary within very narrow limits.

In practice, the needle valve 33 seldom closes entirely one or the other of the valve seats 32, and similarly, the proportioning valve members are normally neither entirely closed nor fully opened, and the bi-metal 35 will act on the needle valve 33 to displace the same, to the left or to the right, to partially open and close the respective bleeding valves 32, so as to move the stem 24 a limited extent, resulting in very accurate proportioning of the hot and cold water.

The temperature setting is adjusted by turning dial 7, the latter being provided with suitable graduations. This causes rotation of piece 41, which, due to the excentrically disposed annular cavity 40, causes oscillating movement of the vertical portion of L-shaped rod 39 and consequent rotation of the horizontal leg 38 of said rod and thereby rotation of the inner end of the spiral bi-metal 35, to thereby adjust the latter to a new setting.

Because rod 39 slidably engages annular cavity 40, the vertical position of block 16 and, consequently, of the L-shaped rod 39 with respect to element 41, will not affect the adjustment of the bi-metal 35, being recalled that block 16 is vertically adjustable to adjust the rate of flow of the outgoing liquid.

Figure 7:
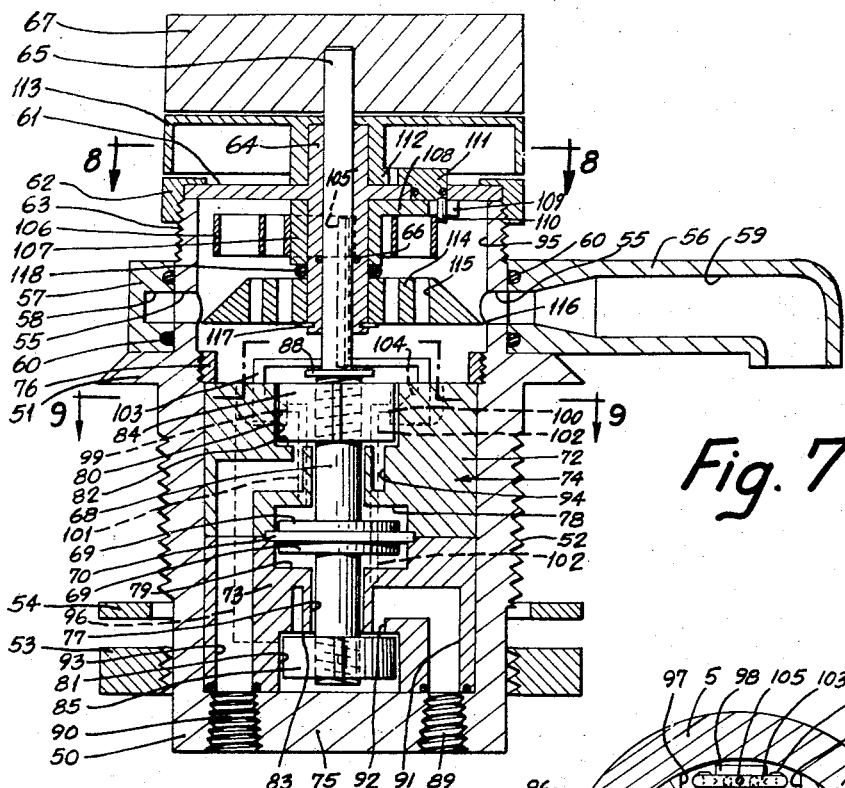
FIGURE 7 is a longitudinal section of a faucet in accordance with a second embodiment.
Figure 8:
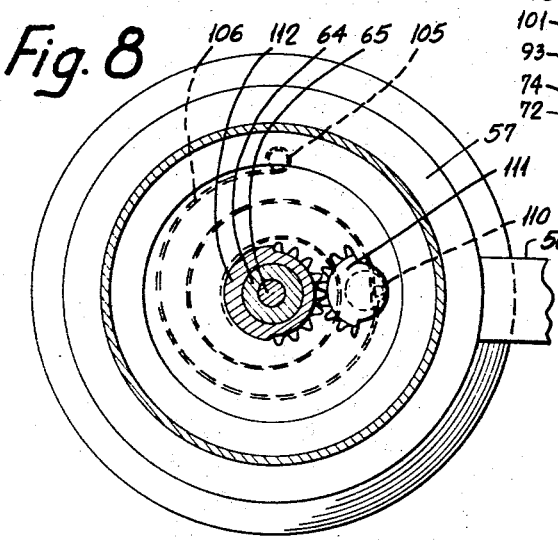
FIGURE 8 is a cross-section, taken along line 8—8 of FIGURE 7.
Figure 9:
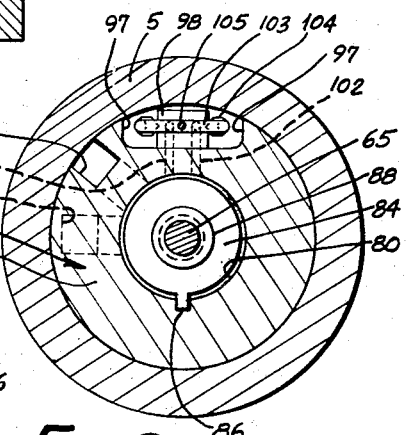
FIGURE 9 is a cross-section, taken along line 9—9 of FIGURE 7.

FIGURES 7 to 9 illustrate a second embodiment of the mixing valve in accordance with the invention, which is of simpler and less expensive construction, which is easier to install on a wash-basin and the like and which is easier to service. This valve comprises a generally cylindrical casing 50 having intermediate its ends a radial outer flange 51, and below said flange a threaded portion 52, on which is normally screwed a nut 53 surrounding casing 50. Thus, the casing may be inserted within a hole of a wash-basin with the flange 51 overlying the marginal portion of the hole and the nut 53 screwed against the underface of the wash-basin, with the interposition of a washer 54.

Above flange 51, casing 50 is provided with holes 55 making communication between the inside of the casing 50, and a discharge spout 56 forming an annular collar 57 surrounding casing 50 and having a groove 58 registering with holes 57 and communicating with the discharge passage 59 of spout 56.

The angular position of spout 56 may be adjusted with respect to casing 50 and said spout has a fluid-tight fit with the casing by means of gaskets 60.

A cover plate 61 closes the top of casing 50 and is maintained thereon by a flange nut 62 screwed on external thread 63 near the top end of casing 50. Cover plate 61 forms a sleeve 64 extending co-axially of casing 50, inwardly and outwardly of the same, said sleeve receiving a spindle 65 which is rotatable therein, an O-ring 66 being provided between sleeve 64 and stem 65 to prevent leakage of water along the spindle.

A manually-operated knob 67 is secured to the upper protruding end of spindle 65. Knob 67 serves to adjust the rate of flow of liquid discharge through spout 56. The inner end of spindle 65 is splined and is slidably inserted within a splined hole at the upper end of a spool 68, which is axially aligned with spindle 65 centrally of casing 50. Thus, rotation of spindle 65 by knob 67 will cause also rotation of spool 68, but the latter can move axially with respect to spindle 65.

The spool 68 is preferably made of two parts in end-to-end relationship and secured together, each part having a flange 69 adjacent each other and between each is sandwiched a flexible diaphragm 70 protruding radially outwardly from the flanges 69. Spool 68 can rotate relative to diaphragm 70.

The radially outer marginal portion of diaphragm 70 is tightly fitted in a water-proof manner within a groove 71 formed at the mating surfaces of the two half-parts 72, 73 of a cylindrical block 74.

Block 74 is fitted within casing 50 and abuts at its lower end against the bottom 75 of casing 50 and is held in position within the casing by means of a locking collar 76, screwed within casing 50 opposite flange 51 and tightly engaging block 74.

Spool 68 loosely extends within an axial bore 77 made in block 74, said bore having a clearance with the spool. In the middle of block 74, the bore 77 forms an enlargement defining half-chambers 78 and 79 on the top and underside of diaphragm 70 respectively and housing said diaphragm and the flanges 69 of the spool 68 and allowing limited axial displacement of the spool relative to block 74.

The outer end of each block half-parts 72 and 73 is provided with a cavity 80, 81 respectively, of cylindrical shape and co-axial with bore 77 such as to define flat valve seats 82, 83 respectively surrounding the bore 77.

A valve member 84 is screwed on the upper end of spool 68, while a valve member 85 is screwed on the lower end of the spool 68. Valve members 84 and 85 at the opposite ends of the spool have opposite pitch, so that rotation of the spool with respect to the two valve members will cause axial movement of the respective valve members in opposite direction.

Valve members 84 and 85 are located in the respective cavities 80, 81 and are axially movable therein, but prevented from rotating with respect to block 74, because they are non-circular and cavities 80, 81 are also non-circular. For instance, there might be provided a tongue and groove system 86 between the valve members and their cavities.

Thus, rotation of stem 65 will cause either opening or closing movement of the two valve members 84 and 85. In their closed position, the valve members abut against seats 82 and 83; in their fully open position, valve member 85 abuts against the bottom 75 of casing 50, while valve member 84 abuts against a flange 88 on stem 65.

Flange 88 also serves as an abutment for spool 68 in the upper axial limit position thereof, while bottom 75 serves as an abutment for the spool in the lower limit position thereof.

Cold and hot water supply piping, not shown, is screwed in the bottom wall 75 of casing 50; for instance, cold water piping is screwed in threaded bore 89 of bottom 75, while hot water piping is screwed in threaded bore 90.

Bore 89 registers with a passage 91 made in the bottom half-part 73 and in turn communicating with an annular notch, or cavity 92, made in valve seat 83 co-axial with bore 77 and surrounding the same, so that the opening of cavity 92 may be closed by valve member 85 which registers with said opening.

Similarly, hot water bore 90 communicates by a passage 93 made in block 74 with an annular cavity 94, similar to annular cavity 92 and opening at valve seat 82, opposite top valve member 84, so as to be closed by the latter.

When top valve member 84 is open, the water discharged in cavity 80, flows around valve member 84 into the mixing chamber 95 defined by the casing 50 above block 74. When the lower valve member 85 is open, cold water flows around said valve member 85 into cavity 81, and from this cavity into mixing chamber 95 through a longitudinal passage 96 which is formed in cylindrical block 74.

Passage 96 is defined by a longitudinal groove made in the cylindrical surface of block 74 and the inside surface of casing 50, and passage 96 opens directly at the top end of block 74 within mixing chamber 95.

The upper end of passage 96 may be flared to by-pass locking collar 76.

Passage 96 is angularly offset from passage 93, as shown in FIGURE 9.

Referring again to this figure, the top and outside surfaces of the top half-part 72 of block 74 are formed with two cavities 97, which are angularly offset from passage 96 and which define therebetween a needle valve body 98, the opposite lateral faces thereof being provided with small diameter openings 99, 100 having a valve seat surrounding the same.

Opening 99 is in communication with the top half-chamber 78 by means of a passage 101, while opening 100 is in communication with the bottom half-chamber 79 by means of a passage 102 made in the two half-block parts 72, 73. A yoke-shaped valve member 103 extends transversely across and over body 98 and downwardly within the two cavities 97 to be terminated by a pointed head 104 adapted to open or close the respective openings 99 and 100 in an alternating manner.

An upstanding rod 105 is secured to the yoke valve member 103 at its lower end, freely extends in mixing chamber 95 and is secured at its upper end to the outer end of a spiral bi-metal heat-responsive element 106, the inner end of which is secured to a sleeve 107 rotatably surrounding sleeve 64 of cover plate 61 and abutting the underside of the latter at one end.

Sleeve 107 has a horizontal flange 108 slidable on the underside of cover 61 and provided with a notch 109 at its periphery. A pin 110 engages notch 109, said pin being eccentrically secured to a pinion sector 111, journalled in cover plate 61 and extending above the same. The teeth of pinion 111 mesh with the teeth of a toothed sleeve 112 which is an integral part of a knob 113 rotatably mounted on sleeve 64 between knobs 67 and cover plate 61.

Thus, knob 113 serves to adjust the temperature at which the water will be discharged. Suitable marks may be inscribed on the cylindrical flange of knob 113 indicating temperatures to be set opposite an arrow, or the like, inscribed on flanged nut 62.

By rotating knob 113, pinion sector 111 is rotated in opposite direction, thereby displacing pin 110, which in turn causes rotation of sleeve 107 and consequent displacement along an arc of a circle, of the inner end of the bi-metal 106. Thus, the yoke valve member 103 is caused to be displaced relative to body 98, so as to close more or less one or the other of openings 99, 100 and to open more or less the other opening.

A disc 114, having through holes 115, is fitted over sleeve 64 of cover plate 61 underneath the bi-metal 106 and above block 74, being located in the mixing chamber 95 at approximately the level of the spout 56. More particularly, disc 114 has bevelled peripheral edge 116 aligned with the bottom of the holes 55 in communication with spout 56, so that the hot and cold water flowing out of block 74 into mixing chamber 95 will have to pass through holes 115 and become thoroughly mixed before reaching bi-metal 106 and only then will be discharged through spout 56.

Disc 114 is retained in position by means of split-retaining ring 117 engaging a groove in sleeve 64. Disc 114 in turn supports sleeve 107 with the interposition of O-ring 118.

The device in accordance with the second embodiment operates as follows:

By rotating the top knob 67, stem 65 causes rotation of spool 68, except diaphragm 70 and except valve members 84 and 85, the latter due to their screwed connection of opposite pitch on the spool, will move away from their respective valve seat 82, 83 to an extent depending on the amount of rotation of knob 67. Thus, the latter serves to adjust the rate of discharge of the water.

The hot and cold water passes into the mixing chamber 95 after having passed around valve members 84, 85 and, finally, the hot and cold water are mixed by the deflector member or disc 114 when they reach bi-metal 106.

Supposing the resultant temperature of the mixed water is exactly the temperature for which the bi-metal element 106 has been set by means of dial knob 113, then, the double needle yoke-shaped valve member 103 is in center position with respect to needle valve body 98. Thus, openings 99, 100 are allowed to discharge at an equal rate of flow. Thus, the hot and cold water entering the two half-chambers 78, 79 on each side of diaphragm 70 through feeding passages which are constituted by the clearance between spool 68 and bores 77, are discharged at an equal rate through the bleeding passages 101 and 102. Therefore, the water pressure on each side of the diaphragm 70 is equal and the spool 68 remains in a centered position with respect to the two valve seats 82 and 83. Thus, the valve members 84 and 85 are also equally spaced from said valve seats 82 and 83 and equal amounts of hot and cold water are discharged.

Supposing the water within the mixing chamber 95 drops below the setting of the bi-metal 106, the bi-metal will displace the double needle valve 103 to one side so as to close bleeding passage 102 and fully open bleeding passage 101. Thus, pressure builds up within the lower half-chamber 79, while the pressure in the top half-chamber 78 is substantially that prevailing in mixing chamber 95. Therefore, there is established a pressure differential which acts on the diaphragm 70 and causes axial displacement of the spool 68 to thereby close the entrance of the cold water by valve member 85 and to fully open the hot water valve member 84. Thus, the cold water is cut off while the hot water is allowed to flow freely into the mixing chamber and then through the spout.

If the water becomes too hot, the bi-metal will immediately move the needle valve 103 in the opposite direction to finally allow only cold water to be discharged.

As in the first embodiment, the proportioning valve is actuated by the water pressure differential on each side of the diaphragm 70 and the bi-metal serves only to displace the small diameter pilot needle valve 103 against the reduced force produced on the latter, under the pressure discharge of the small bore bleeding passages 101, 102.

In practice, the needle valve 103 seldom closes entirely one or the other of the valve openings 99, 100, and the bi-metal will act on the needle valve to displace the same to the left or to the right, to partially open or close the respective bleeding openings 99, 100 so as to move the spools 68 a limited extent, resulting in very accurate proportioning of the hot and cold water.

The various elements of the second embodiment are easy to assemble and disassemble and the valve is of compact form.

From the foregoing, it is seen that the mixing valve in accordance with the invention functions under the new principle that a proportioning valve for controlling the discharge of a liquid from a source, moves under the pressure differential between the source pressure and a lower discharge pressure, said differential being controlled by a pilot needle valve actuated by a temperature responsive element and controlling a bleeding passage.

While a preferred embodiment in accordance with the present invention has been illustrated and described, it is understood that various modifications may be resorted to without departing from the spirit and scope of the appended claims.

What we claim is:

1. A thermostatic mixing valve comprising a block having hot and cold liquid inlet ports, a casing surrounding said block, inlet tubes extending through said casing and communicating with said respective inlet ports, said block having oppositely disposed axially aligned valves in communication with said inlet ports and opening into said casing, a valve stem slidable within said block and extending therethrough and connected to the two valves at both ends thereof, whereby axial movement of said valve stem will open one valve and will close the other, a pressure chamber surrounding the middle portion of said valve stem and made in said block, a fluid-tight diaphragm separating said pressure chamber into two half-chambers, each inlet port communicating with its associated half-chamber for feeding fluid from the respective inlet ports to said separate half-chambers, bleeding passageways connecting each half-chamber with said casing, each bleeding passageway having a valve seat, the two valve seats being spacedly disposed and axially aligned, a common double needle valve member for said two valve seats of said bleeding passageways, said needle valve member being axially displaceable to close one bleeding passageway while opening the other bleeding passageway, and vice versa, and a temperature responsive element immersed in the liquid of said casing, and connected to said needle valve member to displace the same in accordance with temperature variations of said liquid in said casing.

2. A thermostatic mixing valve as claimed in claim 1, wherein said inlet tubes are cold and hot liquid inlet tubes having a sliding fit with said block inlet ports, a knob on top of said casing, a spindle secured to said knob and rotatably mounted in said casing and having a threaded end, a bracket secured to said block and threadedly engaging said threaded spindle, whereby rotation of said knob will cause movement of said block with respect to said inlet tubes, said inlet ports forming blind bores having lateral passageways making the communication between said inlet ports and said axially aligned valves, said movement of said block by said knob causing said inlet tubes to overlap more or less said laterally opening passageways.

3. A thermostatic mixing valve comprising a block having a pair of separate passages for cold and hot fluid under pressure, said passages each having an inlet for connection to a fluid supply under pressure and an outlet forming a valve seat, a casing surrounding said block and in communication with said passage outlets for receiving and mixing said cold and hot fluids, an outlet for said casing arranged above the bottom of said casing, said valve seats being axially aligned, a valve stem slidable within said block and extending therethrough, main valve members secured to both ends of said valve stem and cooperable with said valve seats respectively, whereby axial movement of said valve stem will open one valve member and will close the other, a pressure chamber surrounding the middle portion of said valve stem and made in said block, a fluid-tight diaphragm separating said pressure chamber into two half-chambers, each inlet communicating with its associated half-chamber for feeding fluid from the respective inlets to said separate half-chambers, bleeding passageways made in said block and connecting each half-chamber with said casing, each bleeding passageway having a valve seat formed in said block, the two last-named valve seats being spacedly disposed and axially aligned, a common double needle valve member for said two valve seats of said bleeding passageways, said needle valve member being axially displaceable to close one bleeding passageway while opening the other bleeding passageway and vice versa, and a temperature-responsive element immersed in the fluid of said casing and connected to said needle valve member to displace the same in accordance with temperature variations of said fluid in said casing.

4. A thermostatic mixing valve as claimed in claim 3, wherein said passage inlets comprise bores made in said block, inlet tubes having a sliding fit with said bores, said bores and inlet tubes having parallel axes, said bores having gasket-lined bottoms opposite the open end of said inlet tubes, and manually-operable means on said casing connected to said block to displace the same, with respect to said inlet tubes, to vary the distance of said gasket-lined bottoms of said bores from the outlet ends of said tubes to vary the rate of fluid flow from said inlet tubes.

5. A thermostatic mixing valve as claimed in claim 3, wherein said valve stem has threaded connections of opposite pitch with said two valve members, said valve further having a knob, a spindle secured to said knob and connected to said valve stem for rotating the same, but allowing axial movement of said valve stem with respect to said spindle, rotation of said valve stem causing axial movement of said valve members towards or away from each other, to thereby vary the total rate of flow of the mixed fluid.

6. A thermostatic mixing valve as claimed in claim 5, further including a second knob disposed underneath said first-named knob and rotatably mounted on said casing and connected to one end of said temperature responsive and deformable element to adjust the same.

7. A thermostatic mixing valve as claimed in claim 6, further including a perforated disc arranged in said casing between said block and said temperature responsive and deformable element, so that fluid discharged from said block will pass through the perforations of said disc and be thoroughly mixed before reaching said element.

8. A thermostatic mixing valve as claimed in claim 6, further including a needle valve body having substantially parallel side faces, said bleeding passages opening at said side faces and forming bleeding valve seats, said needle valve being constituted by a common yoke-shaped member having inwardly directed pointed ends adapted to engage said needle valve seats in alternating fashion, said common yoke-shaped member being connected to the end of said temperature responsive and deformable element opposite the end thereof connected to said dial knob.

References Cited
UNITED STATES PATENTS

| | | | |
|---|---|---|---|
| 1,819,045 | 8/1931 | Snediker | 236—12 |
| 1,869,663 | 8/1932 | Cartier | 236—12 |
| 2,415,994 | 2/1947 | Curtis | 236—12 |
| 2,449,766 | 9/1948 | Brown | 236—12 |
| 3,228,603 | 1/1966 | Norman | 236—12 |

EDWARD J. MICHAEL, *Primary Examiner.*

ROBERT A. O'LEARY, W. E. WAYNER, *Examiners.*